Patented Dec. 14, 1926.

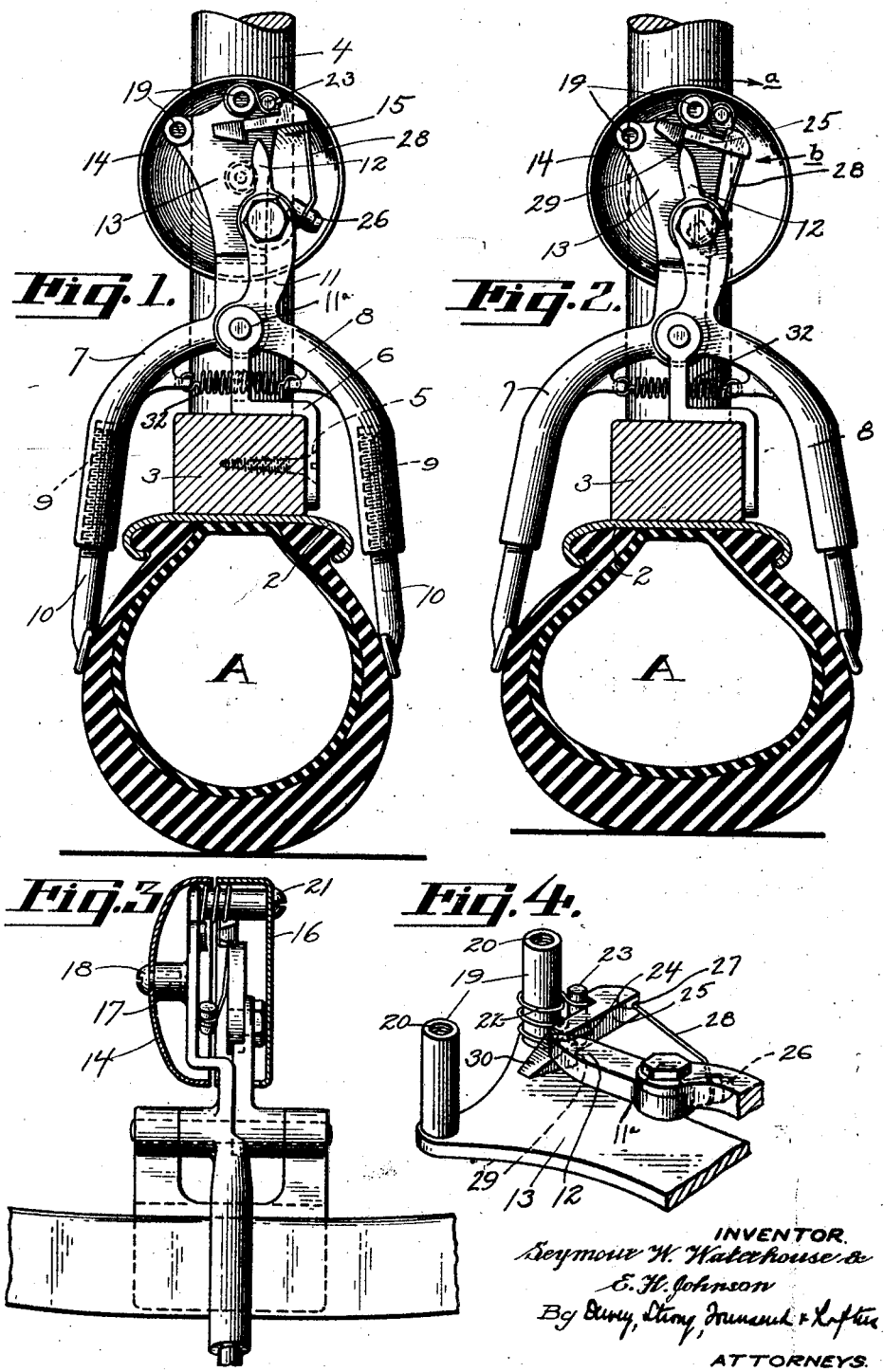

1,610,723

UNITED STATES PATENT OFFICE.

SEYMOUR W. WATERHOUSE, OF SAN FRANCISCO, AND ENOS H. JOHNSON, OF LOS ANGELES, CALIFORNIA.

TIRE-DEFLATION ALARM MECHANISM.

Application filed June 3, 1924. Serial No. 717,670.

This invention relates to an alarm mechanism, and especially to a mechanism which may be attached to the rim or felloe of a pneumatic tire, and which will automatically sound an audible alarm if the tire becomes deflated by puncture or otherwise.

The object of the present invention is to generally improve and simplify the construction and operation of alarm mechanisms of the character described; to provide a mechanism which may be attached to practically any standard wheel or tire now in general use, and which is adjustable to take care of tires and rims of varying size and diameter, and further, to provide a mechanism which is substantial in construction and sensitive in operation, and which can be depended upon to positively sound an alarm under all conditions.

One form which our invention may assume is exemplified in the following description and illustrated in the accompanying drawings, in which—

Fig. 1 is a section of the felloe and rim portion of a wheel, said view showing the pneumatic tire inflated, and said view also showing the position of the alarm mechanism.

Fig. 2 is a similar view showing the tire partially deflated and the alarm mechanism about to be sounded.

Fig. 3 is a side elevation of the alarm mechanism partly in section.

Fig. 4 is a perspective view of a portion of the alarm mechanism.

Referring to the drawings in detail, and particularly to Figs. 1 and 2, A indicates a standard form of pneumatic tire, 2 the rim supporting the same, 3 the felloe, and 4 one of the spokes of the wheel. Suitably secured to the felloe, for instance by means of screws 5, is a bearing bracket 6, and pivotally supported on the bearing bracket are two arms such as indicated at 7 and 8. The arms are disposed one on each side of the felloe and the lower ends are internally threaded as indicated at 9 to support extending arms or shoes 10, which are adapted to engage the sides of the pneumatic tire. The upper end of the arm 8 is extended, as shown at 11, and forms a support for an adjustable tripping pawl 12. The other arm 7 is extended, as indicated at 13 (see Figs. 1, 2 and 4), and this extension forms a support for a bell 14, a sounding mechanism or striker generally indicated at 15, and a housing 16. The extension 13 is provided with a central boss 17 which forms a support for the bell 14; the bell being secured thereto by a central screw 18. The other side of the extension 13 is provided with two bosses as shown at 19. These bosses are internally threaded as indicated at 20. The bosses form a support for the housing 16 and this housing is secured by means of screws 21, which enter the threaded bosses 19.

The extension 13, as previously stated, also forms a support for the striker mechanism generally indicated at 15. This mechanism consists of a helical spring 22 which surrounds one of the bosses 19. (See Fig. 4.) One end of the spring is secured to a pin 23, while the other end 24 is extended to form a support for a pawl 25 and a hammer or striker 26. One end of the pawl 25 is grooved or slotted, as indicated at 27. The wire end 24 passes therethrough and the sides of the pawl are clinched down to clamp the wire in the groove. The wire extension 24 thus forms a resilient arm upon which the pawl is supported. The wire is then extended as indicated at 28 and this extension forms a flexible arm or support for the hammer or striker 26. The other end of the pawl 25 is provided with a shoulder 29 adapted to be engaged by the tripping pawl 12. The upper face of the shoulder is inclined as at 30, and the function of this inclined face will later be referred to.

In actual operation with the mechanism disposed in the position shown in Figs. 1 and 2, it will be noted that the arms 7 and 8 straddle the rim and felloe 3 and that the adjustable shoes 10 supported thereby engage the sides of the tire when normally inflated. It will also be noted that the tripping pawl 12 is actuated by one arm, to-wit, that indicated at 8, and that the alarm mechanism, including the bell 14, is supported by the extension 13 of the other arm indicated at 7. This is of considerable importance as it permits a compounding of the movement between arms 7 and 8 in one instance, and in another instance permits movement of either arm independent of the other.

If the tire is punctured and it begins to slowly deflate, as shown in Fig. 2, spreading of the arms 7 and 8 will gradually take place against the tension of the spring 32 by which the arms are connected. The alarm mechanism will move during the spreading of the arms in the direction of arrow $a$, while the tripping pawl 12 will move in a direction opposite thereto or that indicated by the arrow $b$. The tripping pawl will thus engage the shoulder 29 of the pawl 25 and as the pawl 25 is supported entirely by the extended flexible wire section 24, it will swing about the boss 19 in the direction of arrow $b$, and will continue swinging as long as the arms 7 and 8 move or until the pawl 12 rides free of the shoulder 29. The moment the pawl and the shoulder are freed with relation to each other, pawl 25 swings back to the position shown in Fig. 1 and the hammer 26 will thus strike the bell with a forcible blow as it is swung back instantly and rapidly by the tension produced by the helical spring 22.

It might further be stated that the tire only assumes a flattened or expanded position when in contact with the ground and as this is the case it will return to normal position as the wheel rotates, and as this portion of the tire leaves the ground. The spring 32 will thus pull the arms 7 and 8 together as that portion of the tire leaves the ground and the pawl 12 will thus return to its normal position shown in Fig. 1. When this portion of the tire again reaches the ground during the rotation of the wheel, actuation of the alarm mechanism will again take place and in fact an audible alarm will be given once during each rotation of the wheel. The driver will thus become aware of the fact that the tire is partially deflated or wholly deflated can thus bring the car to a stop and remove or repair the tire before rim-cutting or other damage occurs.

If the car is travelling on a perfectly flat or horizontal road bed, flattening of the tire will take place as indicated in Fig. 2, but if the road bed is crowned or slightly inclined, the tire is liable to roll to one side or another. In this case only one of the arms 7 or 8 would be actuated. This, however, would make no difference as the movement would be more than sufficient to actuate the alarm mechanism. For instance, if the tire rolls to the side indicated by the arm 8, then movement of the pawl 12 only will take place and the alarm will be actuated. Again, if the tire rolls to the side indicated by the arm 7, the entire alarm mechanism moves with relation to the pawl 12 and actuation of the alarm will again take place. Therefore, no matter what happens sounding of the alarm will be insured.

The spring arm or wire extension 24 is fairly rigid in construction. It is, however, sufficiently flexible to permit movement of the pawl 25, as shown in Fig. 2, and return to normal position when released as shown in Fig. 1; a predetermined normal position being maintained by engagement of the extension 24 with the pin 23.

The extension or the wire indicated at 28 is also sufficiently rigid to prevent normal road shocks or vibrations to actuate the hammer and rattle or accidental sounding of the alarm is thus prevented. The extending wire 24 also permits depression of the pawl 25 during return movement of the pawl 12 to normal position. This lateral movement or depression of the pawl 25 is perhaps best illustrated in Fig. 4. The tripping pawl 12 is here shown as returning. Its outer end engages the inclined face 30 and as such depresses one end of the pawl 25. This depression permits the outer end of the pawl 12 to ride over the shoulder 29 and double actuation of the bell striking mechanism is thus obviated. In other words swinging movement is only imparted to the striking mechanism when the pawl 12 moves in the direction of arrow $b$, and it is therefore only necessary to depress the pawl 25 during the return movement of the tripping pawl 12 to permit the pawl to return to normal position as shown in Fig. 1. The flexibility of the wire extension or arm 24 permits a lateral or depressing movement and as such materially simplifies the entire construction of the striker mechanism.

It should be noted that the pawl 12 is secured to arm 11 by means of a cap screw 11$^a$ and as such may be adjusted with relation to the pawl or member 29. This is important as it permits the alarm mechanism to be sounded the moment the pressure in the tire drops to a predetermined point. For instance, by referring to Figs. 1 and 2, if pawl 12 is adjusted or set toward the member 29, a very slight deflation of the tire will cause the alarm mechanism to be actuated. Conversely, if pawl 12 is adjusted away from the member 29, a greater deflation of the tire will be required before the alarm mechanism is actuated.

While certain features of the present invention are more or less specifically illustrated, we wish it understood that various changes in form and proportion may be resorted to within the scope of the appended claims. We similarly wish it understood that the materials and finish of the several parts employed may be such as the experience and judgment of the manufacturer may dictate or various uses may demand.

Having thus described our invention, what we claim and desire to secure by Letters Patent is—

1. The combination with a wheel supported by a pneumatic tire, of a pair of arms pivotally suported on the wheel and adapted to straddle the tire and engaging opposite sides of the tire, an audible alarm mechanism supported by one arm and an alarm actuating mechanism carried by the other arm.

2. The combination with a wheel having a felloe, a rim and a pneumatic tire supported thereby, of a bearing bracket secured to the felloe, a pair of arms pivotally mounted in said bracket, said arms straddling the felloe and rim so as to be disposed one on each side of the tire, an adjustable shoe carried by each arm and adapted to engage the sides of the tire, an audible alarm mechanism supported by one arm and movable in unison with the arm, and an alarm actuating mechanism carried by the other arm and movable in unison with said arm.

3. The combination with a wheel having a felloe, a rim and a pneumatic tire supported thereby, of a bearing bracket secured to the felloe, a pair of arms pivotally mounted in said bracket, said arms straddling the felloe and rim so as to be disposed one on each side of the tire, an adjustable shoe carried by each arm and adapted to engage the sides of the tire, an alarm bell supported by one arm, a striker mechanism for the bell carried by the same arm, a tripping pawl carried by the other arm and engageable with the striker mechanism during movement of the last named arm, and a spring connecting the arms and normally maintaining the shoes in contact with the sides of the car.

4. The combination with a wheel having a felloe, a rim and pneumatic tire supported thereby, of a bearing bracket secured to the felloe, a pair of arms pivotally mounted in said bracket, said arms straddling the felloe and rim so as to be disposed one on each side of the tire, a pair of shoes carried one by each arm, means maintaining the shoes in contact with the sides of the tire, means permitting vertical adjustment of the shoes with relation to the tire and their supporting arms, a bell supported on one arm, a striker mechanism supported by the same arm, and a striker actuating mechanism carried by the other arm.

5. The combination with a wheel supported by a pneumatic tire, of a pair of arms mounted on a common pivot carried by the wheel, said arms straddling the tire and engaging opposite sides thereof, an alarm bell supported by one arm, a striker mechanism within the alarm bell, a pawl carried by the other arm, said pawl adapted to actuate the striker mechanism during movement of either arm, and means for adjusting the position of the pawl.

SEYMOUR W. WATERHOUSE.
ENOS H. JOHNSON.